Nov. 5, 1957 R. A. HENLE 2,812,474
CONTROL CIRCUIT EMPLOYING TRANSISTORS
Filed Sept. 30, 1954
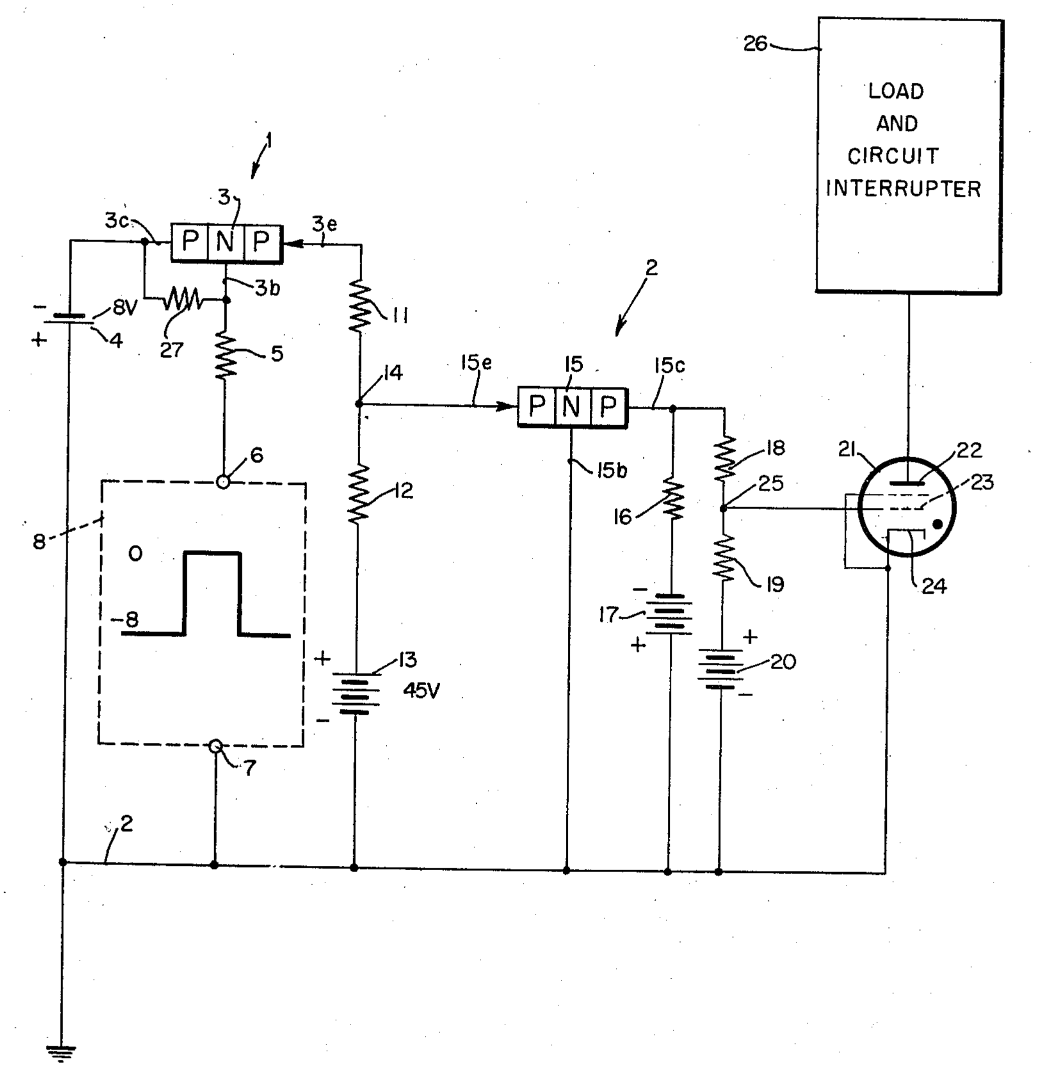
*INVENTOR.*
ROBERT A. HENLE
*BY* P. E. Henninger
ATTORNEY 2,812,474

CONTROL CIRCUIT EMPLOYING TRANSISTORS

Robert A. Henle, Hyde Park, N. Y., assignor to International Business Machines Corporation, New York, N. Y., a corporation of New York Application September 30, 1954, Serial No. 459,383

3 Claims. (Cl. 315—168)

This invention relates to control circuits and is especially concerned with a circuit for producing a control signal varying between two specified potential values and between terminals of specified impedance characteristics, in response to a received signal varying between two different potential values and supplied at terminals of different impedance characteristics. Typically, a control circuit constructed in accordance with the invention may be employed to control a Thyratron in response to an input signal which varies from a negative value to zero.

Thyratrons and similar gas filled electron tube devices are commonly connected in circuits in which they have impressed between their anode and cathode a potential sufficient to initiate a discharge. Such initiation of a discharge is controlled by impressing upon a grid or control electrode between the anode and cathode a potential sufficiently negative with respect to the cathode potential. The discharge may then be initiated under control of the grid by simply changing the grid potential to a more positive value. The discharge, once initiated, continues until the anode circuit of the Thyratron is interrupted externally, the grid being incapable of interrupting the discharge. In order to turn a Thyratron on, it is commonly necessary to shift the grid from a negative potential to a positive potential.

The input impedance of such a Thyratron control circuit is commonly relatively low.

Modern high speed computers utilize square wave pulses, which may be either positive or negative. In any event the potential range selected for the signal pulses is not commonly suitable for the direct control of Thyratrons. For example, a particular type of computer uses a square wave signal which varies from a background potential of —5 volts to a signal potential of 0 volt. The signal sources in such computers are commonly high impedance sources.

An object of the present invention is to provide a translator and amplifier circuit which will shift a square wave signal to a different voltage range and to a circuit portion having different impedance characteristics.

A further object is to provide such a translator and amplifier circuit including transistors.

The foregoing objects are attained in the circuit described herein, by utilizing an emitter follower circuit of the type disclosed in the co-pending application of George D. Bruce, Robert A. Henle and James L. Walsh, Serial No. 459,382 filed September 30, 1954. This emitter follower circuit is coupled to an amplifier circuit, whose output is connected to the grid of a Thyratron which is being controlled.

Other objects and advantages of the invention will become apparent from a consideration of the following specification and claims, taken together with the accompanying drawing.

In the drawing, the single figure represents a wiring diagram of an electric circuit embodying the invention.

The circuit illustrated includes an emitter follower circuit generally indicated by the reference numeral 1, and an amplifier circuit generally indicated by the reference numeral 2.

The emitter follower circuit comprises a PNP junction transistor 3 having an emitter electrode **3*e*, a base electrode 3*b* and a collector electrode 3*c*. The collector electrode 3*c* is connected through a biasing battery 4 to a grounded wire 2. The base electrode 3*b* is connected through a resistor 5 to a signal input terminal 6. Another signal input terminal 7 is connected to the grounded wire 2. Between the input terminals 6 and 7 is connected a square wave signal generator generally indicated by the reference numeral 8**, and which typically has high internal impedance.

The signal generator 8 is indicated, by way of example, as shifting between a "no signal" potential of —5 volts between input terminals 6 and 7, and a "signal" potential of 0 volt.

Emitter electrode **3*e* is connected to a load circuit including in series a resistor 11, a resistor 12, and a battery 13**.

As suggested in the Bruce et al. application, Serial No. 459,382, mentioned above, it may in some instances be desirable to provide a resistor 27 between base **3*b* and collector 3*c* to keep the transistor conducting, in case the base 3*b* is left floating. The junction 14 between the resistors 11 and 12 serves as an output terminal for the emitter follower circuit 1 and as an input terminal for the amplifier circuit 2. Amplifier circuit 2 includes a PNP junction transistor 15 having an emitter electrode 15*e*, a base electrode 15*b*, and a collector electrode 15*c*. Emitter electrode 15*e* is connected directly to junction 14, base 15*b* is connected directly to grounded wire 2. Collector electrode 15*c* is connected to a loop circuit having two branches extending between the collector 15*c* and ground. One of these branches comprises a load resistor 16 and a battery 17, whose polarity is suitable for supplying the collector-base circuit of the transistor 15. The other branch of the loop circuit includes in series a resistor 18, a resistor 19 and a battery 20. The polarity of battery 20 is opposite to that of battery 17 with respect to ground and it cooperates with the battery 17 to send a current through the loop circuit which includes resistors 16, 18 and 19 and the batteries 20 and 17**.

A Thyratron 21 has an anode 22, a control electrode 23 and a cathode 24. Cathode 24 is connected to ground. Control electrode 23 is connected to the junction 25 between the resistors 18 and 19. Anode 22 is connected to a load circuit which includes any conventional mechanism for interrupting the load circuit. The load circuit and its components are generally indicated in the drawing by the reference numeral 26.

OPERATION

The operation will be described as applied to an input signal having a background or no signal value of —5 volts and a signal value of 0 volt. The Thyratron 21 will be described by way of example as a type 2D21 Thyratron. The operation of the emitter follower circuit is substantially the same as that described in the Bruce et al. application, mentioned above.

When there is no signal at the input, terminal 6 is at a potential of —5 volts. The battery 13 holds the emitter **3*e* sufficiently positive with respect to base 3*b* so that the transistor 3 is continuously conductive. Resistor 11 is much lower than the resistor 12, and the junction 14 is at approximately —2.8 volts, so that the emitter 15*e* is at a potential below that of the grounded base 15*b*, and the transistor 15 is cut off. The potential at junction 25 is then determined, by the terminal voltages of the batteries 17 and 20 and the resistances of the resistors 16, 18 and 19. In the present example, these circuit elements are chosen so that junction 25** is then at a potential of −12 volts.

When a signal appears from generator 8, terminal 6 goes to ground potential. The base *3b* and emitter *3e* follow, shifting to potentials slightly above ground. The potential of junction 14 is also raised, but is prevented from going much above ground by the clamping action of the emitter of transistor 15. Transistor 15 starts to conduct, thereby increasing the potential drop in the resistor 16, and shifting the potential of junction 25 in a positive direction, tending to establish the output at +5 volts.

It will be recognized that where I have shown PNP transistors, NPN transistors may alternatively be used, by making suitable changes such as reversing the polarities of all the batteries.

The following table shows by way of example particular values for the potentials of the various batteries and for the impedances of the various resistors in a circuit which has been operated successfully. In some cases these values are also shown in the drawing. These values are set forth by way of example only, and the invention is not limited to these values nor to any of them.

*Table I*

| | | |
|---|---|---|
| Battery 4 | volts | 8 |
| Resistor 5 | ohms | 510 |
| Resistor 11 | do | 820 |
| Resistor 12 | do | 18K |
| Battery 13 | volts | 45 |
| Resistor 16 | ohms | 27K |
| Battery 17 | volts | 45 |
| Resistor 18 | ohms | 8.2K |
| Resistor 19 | do | 62K |
| Battery 20 | volts | 45 |
| Thyratron 21 | | Type 2D21 |
| Resistor 27 | ohms | 100K |

While I have shown and described a preferred embodiment of my invention, other modifications therefore will readily occur to those skilled in the art, and I therefore intend my invention to be limited only by the appended claims.

What is claimed is:

1. An amplifier comprising a transistor having a base electrode, an emitter electrode and a collector electrode, input means connected to the emitter electrode, a connection between the base electrode and ground, a load circuit branch for said transistor including in series a load resistor and a first source of unidirectional electrical energy and connected between said collector electrode and ground, an output circuit branch connected in parallel with said load circuit branch and comprising a second source of unidirectional electrical energy and two resistors in series, said second source being poled oppositely to said first source with respect to the connections of said parallel branches, an output terminal connected to the junction between said two resistors in series, said parallel branches forming a loop in which the first and second sources aid in producing a current flow, and means for shifting said transistor between a low conductivity state in which said loop current flow determines the potential of said output terminal and a high conductivity state in which a substantial load current flows through said load current branch and the potential of said output terminal is shifted due to the increased potential drop across said load resistor.

2. An amplifier as defined in claim 1, in which said shifting means comprises an input stage including a second transistor having a base electrode, a collector electrode and an emitter electrode and connected as an emitter follower, signal input means connected between the input stage base electrode and ground, biasing means connected between the input stage collector electrode and ground, load means connected between the input stage emitter electrode and ground, said load means comprising, in series, third and fourth resistors and a third source of unidirectional electrical energy, and an output terminal at the common junction of said third and fourth resistors; and means connecting said output terminal to the emitter of the first-mentioned transistor, said biasing means and said third source cooperating to maintain said second transistor in a high conductivity state in the absence of a signal at said input means, the current flow through said third and fourth resistors being then effective to hold the emitter of said first-mentioned transistor at a potential such that the first-mentioned transistor is in a low conductivity state, said signal input means being operable to apply to said input stage base electrode, a signal effective to switch said second transistor to a low conductivity state, said third source being then effective to hold the emitter of said first-mentioned transistor at a potential such that the first-mentioned transistor is in a high conductivity state.

3. A circuit for driving a thyratron, comprising a thyratron having a cathode and a control electrode, an amplifier stage having an output terminal connected to said control electrode; said amplifier stage comprising a transistor having a base electrode, an emitter electrode and a collector electrode, input means connected to the emitter electrode, a connection between the base electrode and ground, a load circuit branch for said transistor including in series a load resistor and a first source of unidirectional electrical energy and connected between said collector electrode and ground, an output circuit branch connected in parallel with said load circuit branch and comprising a second source of unidirectional electrical energy and two resistors in series, said second source being poled oppositely to said first source with respect to the connections of said parallel branches, said output terminal being connected to the junction between said two resistors in series, said parallel branches forming a loop in which the first and second sources aid in producing a current flow, and means for shifting said transistor between a low conductivity state in which said loop current flow determines the potential of said output terminal and a high conductivity state in which a substantial load current flows through said load current branch and the potential of said output terminal is shifted due to the increased potential drop across said load resistor.

References Cited in the file of this patent

UNITED STATES PATENTS

| | | |
|---|---|---|
| 2,663,800 | Herzog | Dec. 22, 1953 |
| 2,670,445 | Felker | Feb. 23, 1954 |